United States Patent [19]

Alfonso

[11] Patent Number: 4,796,947

[45] Date of Patent: Jan. 10, 1989

[54] REVERSIBLE MOTOR VEHICLE ROOF

[75] Inventor: Lelio Alfonso, Turin, Italy

[73] Assignee: Vallko S.r.l., Turin, Italy

[21] Appl. No.: 77,249

[22] Filed: Jul. 24, 1987

[30] Foreign Application Priority Data

Aug. 1, 1986 [IT] Italy ................................ 67625 A/86

[51] Int. Cl.⁴ ............................................. B60J 7/057
[52] U.S. Cl. ...................................... 296/223; 49/325
[58] Field of Search ...................... 296/216, 218, 223;
49/325

[56] References Cited

U.S. PATENT DOCUMENTS 3,911,802 10/1975 Morden ............................ 296/223 X
4,618,182 10/1986 Farmont .............................. 296/223

FOREIGN PATENT DOCUMENTS

010610 4/1984 European Pat. Off. ............ 296/223
0106611 4/1984 European Pat. Off. ............ 296/223
3316473 11/1983 Fed. Rep. of Germany .
3404693 9/1985 Fed. Rep. of Germany .
3425103 1/1986 Fed. Rep. of Germany .
422781 1/1935 United Kingdom .................. 49/325
466786 6/1937 United Kingdom .................. 49/325
1221062 2/1971 United Kingdom .

*Primary Examiner*—Dennis H. Pedder
*Attorney, Agent, or Firm*—Birch, Stewart, Kolasch & Birch

[57] ABSTRACT

A reversible roof of a motor vehicle includes an elongate hollow body fixed to the frame of the roof, in which there are slidable towards and away from one another the ends of a highly elastic lamina whose central section protrudes from an opening of the hollow body and which is rigidly connected to the roof. A manually pivotable knob, disposed outside the hollow body, is connected to mechanical members which determine the approaching or the moving away of the ends of the lamina within the body depending on the direction of rotation of the knob, thus giving rise to the exit or re-entry of the central section of the lamina from or into the body, respectively, and therefore to the opening or the closure of the roof.

9 Claims, 7 Drawing Sheets

REVERSIBLE MOTOR VEHICLE ROOF

BACKGROUND OF THE INVENTION

1. Field of the Invention

This invention relates to a reversible roof of motor vehicles.

2. Description of Related Art

Among the reversible roofs installed as primary equipment or as accessories, there are some which may be left open in an infinite number of angled positions relative to the roof of the vehicle.

The opening control device of these roofs is formed by a pivotable knob or lever which sequentially determines the various angular opening positions of the roof.

In some cases the lever or knob operates a group of telescopic tubes whose end portions are rigidly connected to the frame and to the roof respectively. The withdrawal of the tubes due to the action of the lever or knob causes the progressive opening of the roof up to the position of maximum extension of the telescopic tubes.

According to another technical solution, the lever or knob gives rise to the compression or extension, respectively, of a spiral spring compressed between the frame and the roof. Also in this case, an infinite number of opening positions of the roof between the closed position and the position of maximum opening are obtained.

However, both systems are rather complex from the constructional point of view, and always form cumbersome units which do not permit a large angle of maximum opening of the roof primarily because of the installation difficulty within small spaces of such complex opening devices which at the same time need to carry out ample movements between their extreme operative positions.

It is also obvious that complex devices lead to a high cost of the roof, so as to render it unappealing to the purchaser.

OBJECTS AND SUMMARY OF THE INVENTION

The object of the invention is to provide an opening device for a reversible motor vehicle roof with infinite angular positions of the roof, which is simple to manufacture, has small overall dimensions and has an infinite number of opening positions up to a maximum opening position sufficient to fully exploit all the advantages of the reversible roofs.

Besides being simple to manufacture, the proposed roof is also of a very moderate cost in comparison with those which are used at the present time, and rarely subject to failures, defects, or breakage due to its structural simplicity.

For these and further objects which will be more clearly apparent from the following description, the invention proposes to provide a reversible motor vehicle roof, comprising an elongate hollow body fixed to the frame of the roof, in which there are installed, in a mutually sliding fashion towards and away from one another, the ends of a lamina or elastically yielding thread whose central section protrudes from an opening of the hollow body and is rigidly connected to the roof, manual and electric control means being provided, which through a mechanical transmission contained within the body determine the sliding of the ends of the lamina towards and away from one another, thus giving rise to the opening or the closure of the roof, respectively.

BRIEF DESCRIPTION OF THE DRAWINGS

The subject matter of the invention is described hereunder with reference to the annexed drawings in which.

DETAILED DESCRIPTION OF PREFERRED EMBODIMENTS

By examining first the embodiment represented in FIGS. 1 to 5, it is noticed that the device according to the invention consists of an elongate box-shaped flat body 10 fixed to the frame 11 of the rim applied onto the space formed in the roof of the vehicle.

Formed centrally in the body 10 are two holes, of which the lower 12 is intended to allow the insertion of the relief 13 of a knob 14, while an upper hole 15 allows coupling with the curved walls 16 of the body 10; with a slight clearance, the walls of a circular plate 17, disposed inside the body itself, rigidly connected to the knob 14 by means of bolt 9.

Moreover, inserted between the plate 17 and the relief 13 is a gear 18, also rigidly connected to the knob 14.

Meshing with the gear 18 are two racks 19 diametrically opposite relative to the gear (FIG. 3) and hinged at 20, by their ends, to plates 21.

Racks 19, in addition to meshing with the gear 18, are constrained to slide along guides 22 of the body 10 (FIG. 3), the racks 19 being provided with pivots 23 inserted into said guides.

For reasons which will be explained later, guides 22 have a long rectilinear section which is radiused to a curved section in the zone of the gear 18, whose curvature they follow.

The plates 21, slidingly lodged within the body 10, are rigidly connected to further upper plates 24 and between them there is pinched in a stable manner the end of an harmonic spring 25 which freely extends above the rack 19, passes between the walls 16 of the body 10 and the circular plate 17 and then becomes rigidly engaged, in its median section, on the inner face of the reversible roof 26.

Figure 1:
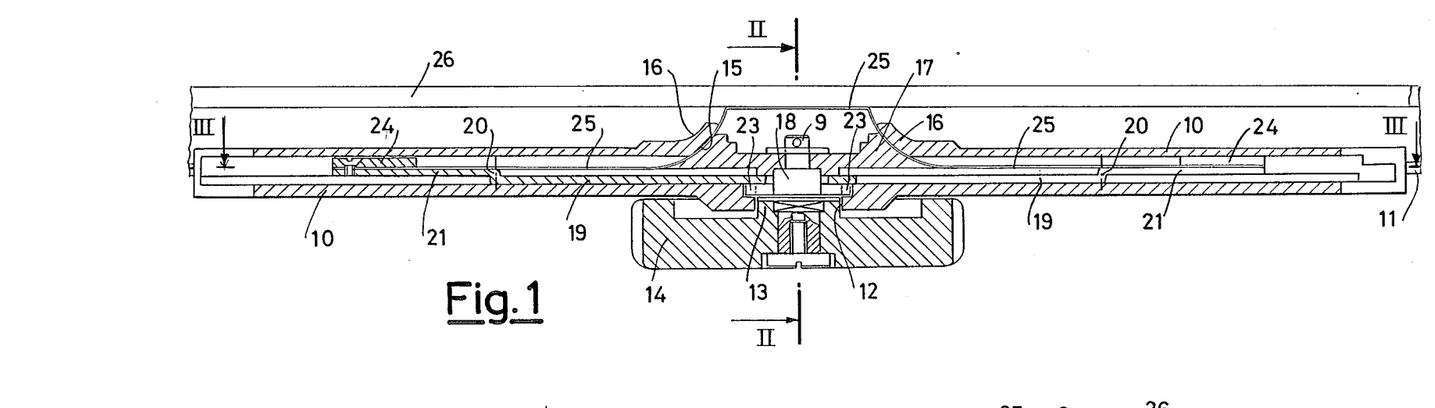
FIG. 1 is a vertical section of the roof in its closed condition, traced in the zone of the opening device according to the invention, according to a first embodiment thereof.
Figure 2:
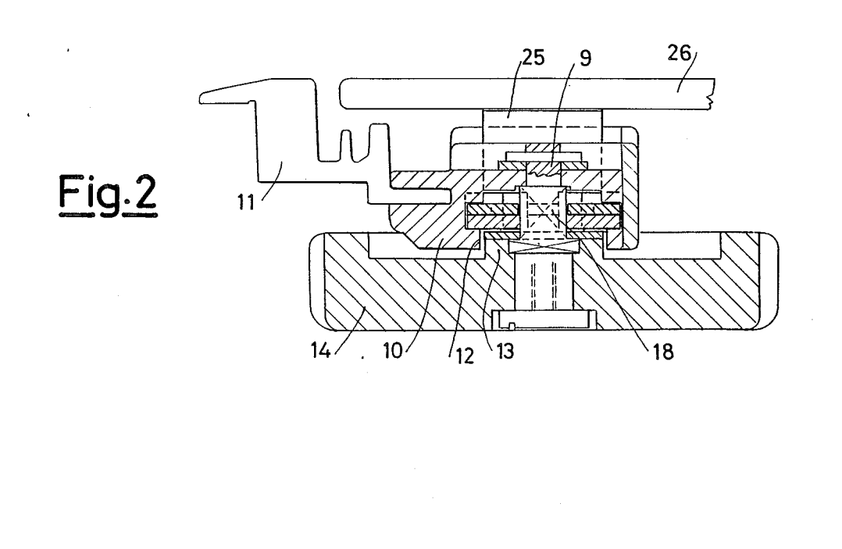
FIG. 2 is a section along line II—II of FIG. 1.
Figure 3:
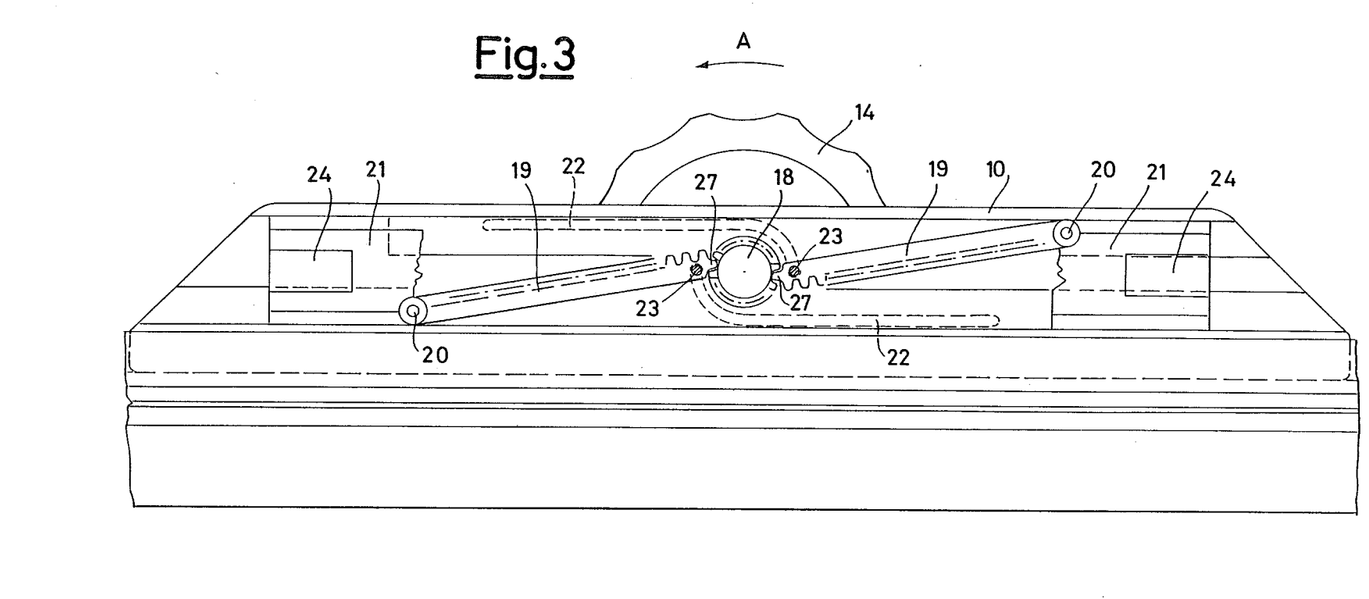
FIG. 3 is a section along line III—III of FIG. 1.

Starting from the closed position shown in FIGS. 1, 2 and 3, if the knob 14 is rotated in the direction of the arrow A of FIG. 3, the gear 18, rigidly connected to the knob, drags into rotation the front teeth 27 of the racks 19, which in the meantime rotate together with the pins 23 which frictionally slide within the curved sections of the guides 22.

Figure 5:
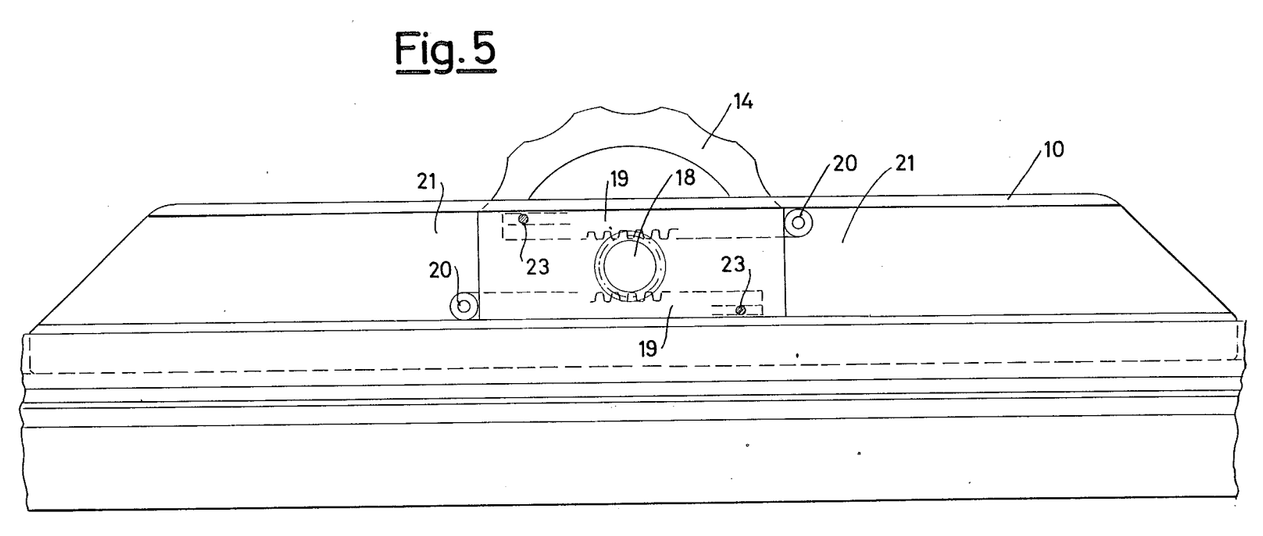
Figure 6:
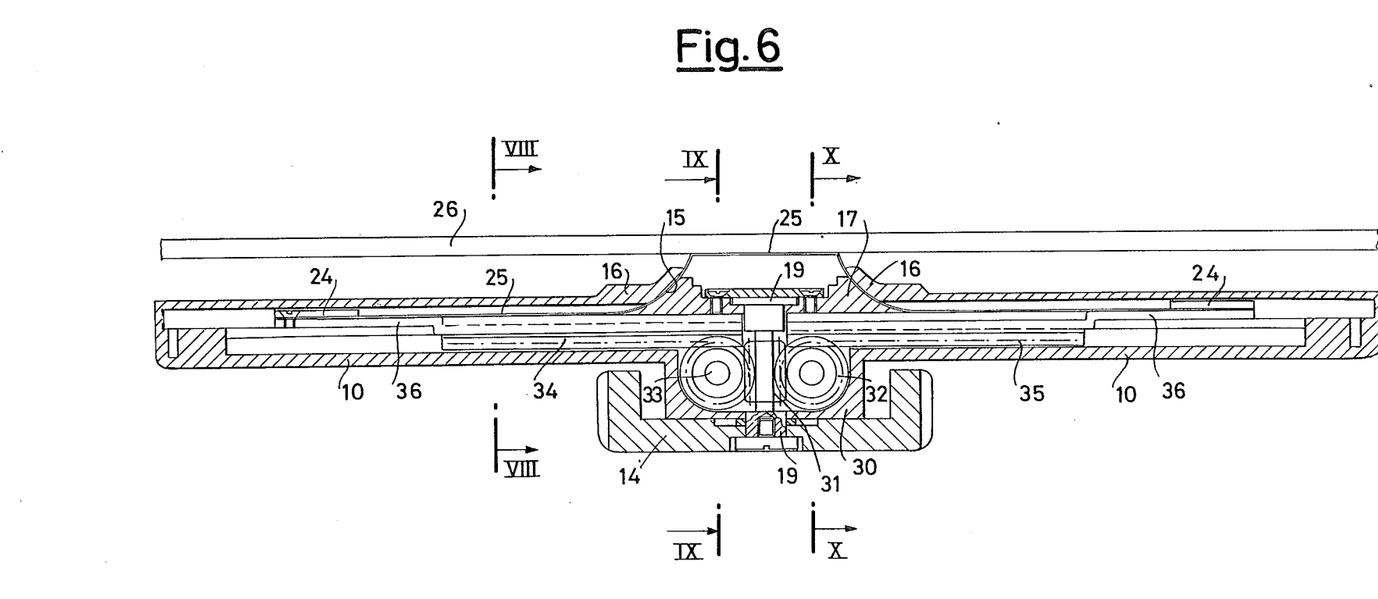
FIGS. 6 and 7 are similar to FIGS. 1 and 3 with the roof in its closed position, but with the device of the invention according to a second embodiment.
Figure 7:
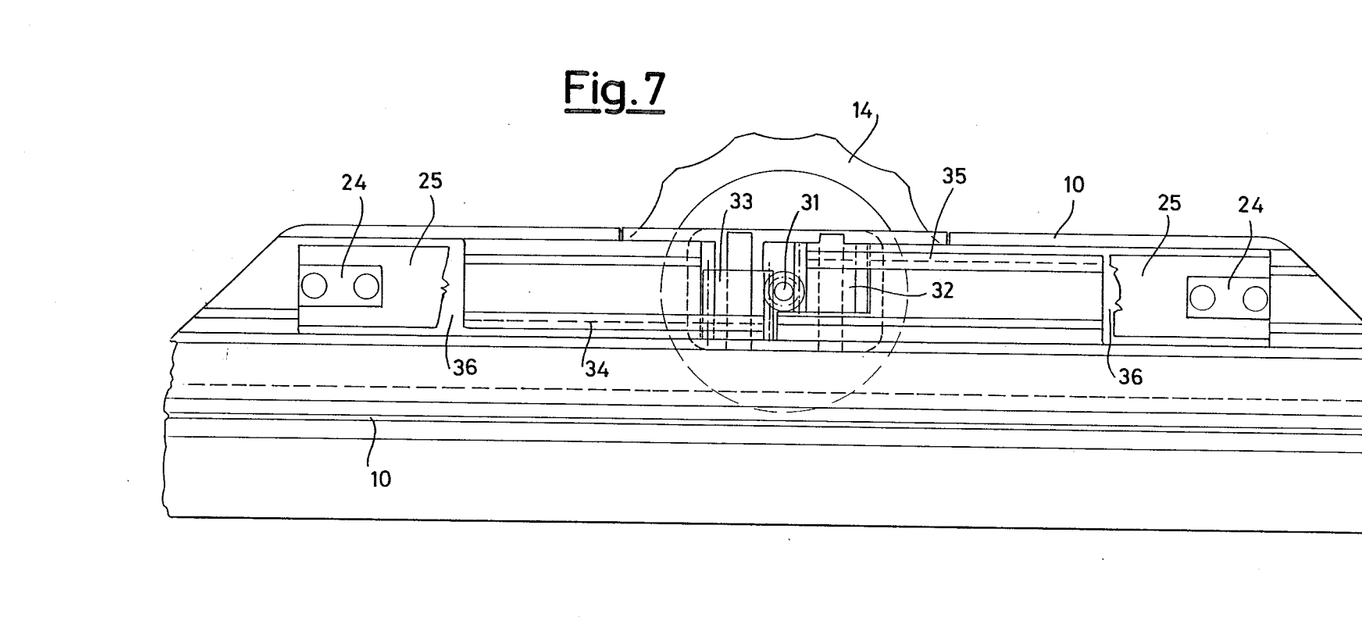
Figure 8:
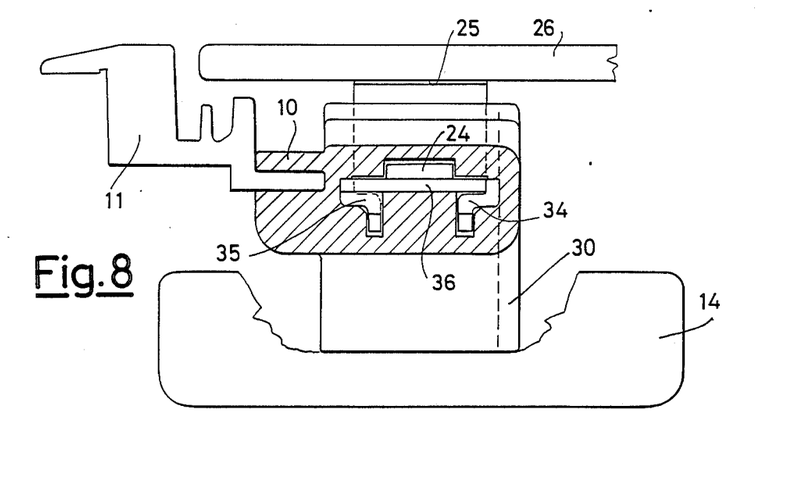
FIGS. 8, 9 and 10 are sections along lines VIII—VIII, IX—IX and X—X, respectively, of FIG. 6.
Figure 9:
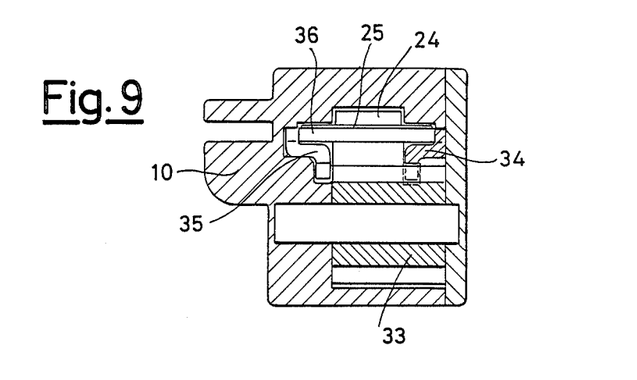
Figure 10:
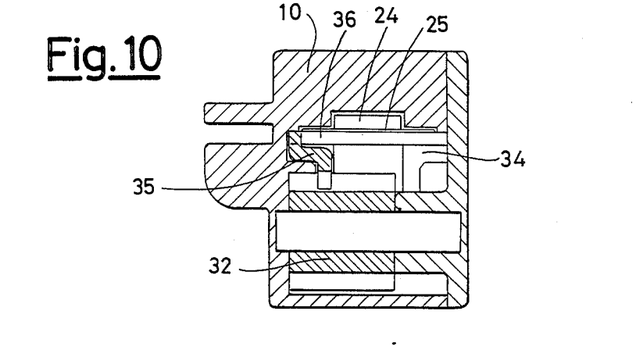

When the racks 19, by continuing to rotate the knob 14, have reached a position in which they are parallel with one another, as shown in FIG. 5, they begin to slide parallel with themselves thereby meshing with the gear 18, and the pins 23 slide within the rectilinear sections of the guides 22.

This means that the end plates 21 and 24 slide within the cavity of the body 10 by mutually moving towards the knob 14 itself.

Figure 4:
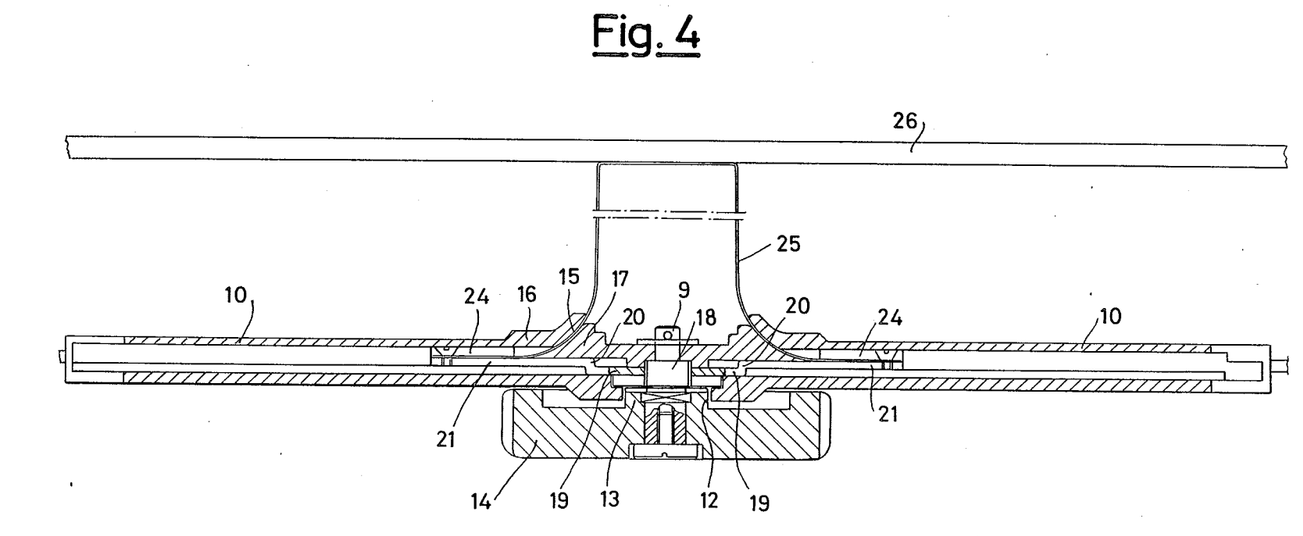
FIGS. 4 and 5 are similar to FIGS. 1 and 4, respectively, but with the roof in an opened position.

The spring 25 is consequently boosted upwardly by this approaching of its ends, by centrally slipping off between the walls 16 and 17, as shown in FIG. 4, so that the roof 26 rises by angularly rotating on its conventional hinges.

It is obvious that by leaving the knob 24 in a rotational position, the roof remains open in that position, because there is no freedom of sliding of the spring 25 in the two directions, inasmuch as the racks 19 are locked on the respective teeth of the gear 18 and the plates 21 and 24 cannot slide within the body 10.

The maximum opening corresponds to the maximum length of the racks 19, so that it varies solely as a function of how elongate the body 10 is desired to be made, which does not involve limitations since it extends on the longer side of the frame of the roof and hence has at its disposal a space which is considerably larger than the space required for obtaining a remarkable maximum opening of the roof, beyond which there is no further advantage.

When closing the roof, the user obtains the position of complete closure when the pins 23 of the racks 19 move along the last curved section of the guides 22 and the teeth mesh with the gear 18.

In this last stage of rotation of the knob 14 the user will notice a slight resistance of the system which informs him that he is on the point of completing the closure, which takes place when the pins 23 attain the end of stroke within the guides 22, as can be seen in FIG. 3.

In addition to a positive method of closing, this provision also allows the user to perceive that the closure is on the point of being achieved which, in the conventional roofs, usually is not provided and the user notices that he has reached the complete closure only when his efforts on the knob to continue its rotation are stopped.

The second embodiment of the device according to the present invention, shown in Figures from 6 to 10, is more simple than the preceding embodiment, in that no provision is made therein for the use of a locking system of the roof in the position of closure, described above, but it attains the same advantages thereof by using an actuator unit which is equivalent from a functional point of view.

The same reference numerals correspond to like parts in the two embodiments shown in FIGS. 1 to 5 and FIGS. 6 to 10.

In the embodiment shown in FIGS. 6 to 10, the body 10 has a lower central hollow drawing 30, on which the knob 14 is pivoted.

The knob 14 is rigidly connected to a pinion 31 with which two gears 32 and 33, are lodged in the region 30 of the body 10. In mesh with each gear is a rack 34 and 35 which terminates, at its other end, with a plate 36.

Pinched between these plates 36 and the upper plate 24 are the ends of the harmonic spring 25, which uncoils, as in the preceding embodiment, between the walls 16 and 17 and is rigidly connected centrally to the roof 26.

When the knob 14 is made to rotate in the two opposite directions, the gears 32 and 33 which mesh with the pinion 41 are also rotated. Consequently, the racks 34 and 35 slide mutually towards and away from one another depending on the direction of rotation of the knob.

As already illustrated in the preceding embodiment, the approaching of the racks gives rise to to the extension of the spring centrally beyond the body 10 and, consequently, the rise of the roof up to the position of maximum opening corresponding to the end of travel of the racks.

The rotation of the knob 14 in the opposite direction, instead, causes the return of the spring 25 into its seating up to the closure of the roof (position shown in FIGS. 6 to 10.

I claim:

1. A reversible roof for a motor vehicle, comprising:
 a hollow elongate body fixed to the frame of the roof and in which there are mutually slidable towards and away from one another the distal ends of a lamina whose central section protrudes from an opening of the hollow body and is rigidly connected to the reversible roof;
 manual control means for actuating a mechanical transmission contained within the body which is separately connected and acts at the distal ends of the lamina, thereby sliding the lamina in opposite directions towards and away from the control means thus producing the opening and closing of the roof, respectively.

2. A reversible roof according to claim 1, wherein said control means is a knob, disposed outside the body, rotating about a substantially vertical axis, to which a gear is rigidly connected for rotation therewith, with which gear two racks are in mesh, to each of which racks a distal end of the lamina is connected.

3. A reversible roof according to claim 2, wherein the racks are hinged to clamped blocks at the distal ends of the lamina and are each provided with a pin sliding in respective guides on opposite sides of the gear, said racks having a curved end section to follow the curvature of the gear for 90° of its periphery, said racks being provided with a further front tooth which is in mesh with the gear during the sliding of the respective pin in the curved section of its guide.

4. A roof according to claim 1, wherein the lamina is pinched at its ends between two plates sliding in the body, said plates constrained to said control means by said transmission for sliding said plates.

5. A roof according claim 1, wherein said control means includes a knob and a pinion rigidly connected for rotational movement therewith, and wherein two gears are each laterally in mesh with one of a pair of racks of said transmission, said racks contained in a sliding fashion within the hollow body and to which the distal ends of the lamina are rigidly connected.

6. A reversible roof for a motor vehicle comprising:
 a hollow elongate body fixed to the frame of the roof and in which there are mutually slidable towards and away from each other the ends of a lamina whose central section protrudes from an opening of the hollow body and is rigidly connected to the reversible roof;
 control means for sliding said reversible roof;
 a mechanical transmission contained within the hollow body and connected to said control means for sliding towards and away from the control means, thereby opening and closing the reversible roof, respectively;
 said control means including a knob, disposed outside of the hollow body, rotatable about a substantially vertical axis, a gear rigidly connected to said knob for rotation therewith, and two racks in mesh with said gear, wherein each end of the lamina is connected to one of said two racks, respectively.

7. A reversible roof according to claim 6, wherein said racks are hinged to the ends of the lamina and are each provided with a pin sliding in respective guides on opposite sides of the gear, said racks having a curved end section to follow the curvature of the gear for 90° of its periphery, said racks being provided with a further front tooth in mesh with the gear during sliding of the respective pin in the curved section of its guide.

8. A reversible roof according to claim 6, wherein the lamina is pinched at its ends between two plates sliding in the body and said plates are constrained to said control means by said transmission for sliding said plates.

9. A reversible roof according to claim 6, wherein said gear is a pinion rigidly connected to said knob for rotational movement therewith, and wherein two further gears driven by said pinion are each laterally in mesh with one of said two racks, said racks contained in a slidable position within the hollow body and to which the ends of the lamina are rigidly connected.

* * * * *